United States Patent Office 2,863,632
Patented Dec. 9, 1958

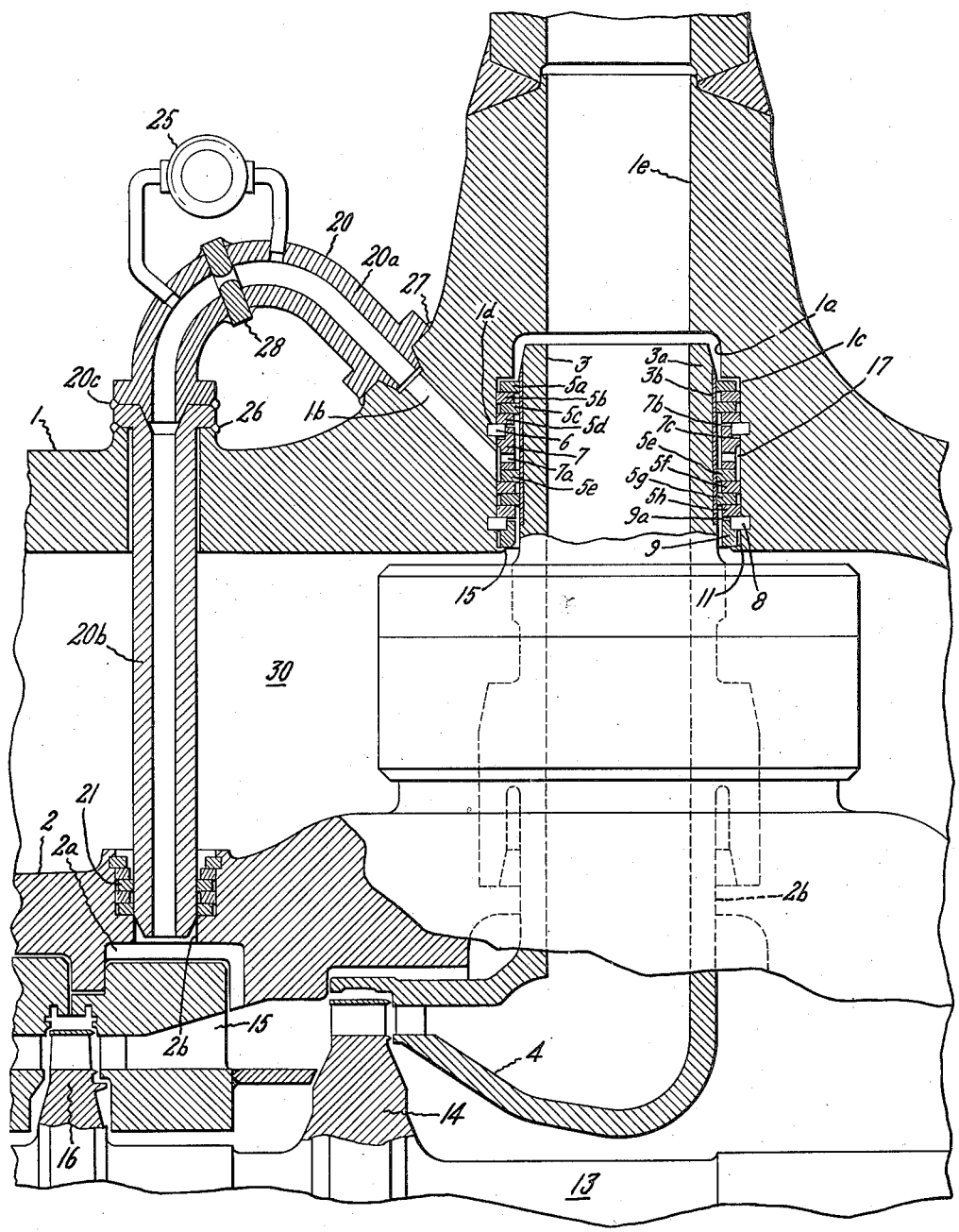

2,863,632

SLIP RING EXPANSION JOINT

Edward H. Miller, Rexford, N. Y., assignor to General Electric Company, a corporation of New York Application December 17, 1956, Serial No. 628,843

4 Claims. (Cl. 253—39)

This invention relates to slip-type expansion joints, particularly to a multiple ring-sealed slip joint for connecting a high temperature high pressure steam conduit to the casing of a steam turbine or like structure.

The conventional steam turbines designed for pressures above 1000 p. s. i. are of the "double shell" construction in which the high pressure turbine element is surrounded by a heavy spaced outer casing, with an intermediate steam pressure maintained between the two casings. The double-shell casing arrangement inherently complicates the matter of connecting the high pressure steam inlet conduit to the turbine casings due to the differential thermal expansion of the conduit and the two shells through which it must penetrate. To accommodate differential thermal expansion between the inlet conduit and the turbine casings while substantially preventing the leakage of high pressure steam therebetween, it has been common practice to provide a slip-type expansion joint of the type disclosed in Patent 2,112,738, issued March 29, 1938 in the name of J. H. Doran and assigned to the same assignee as the present application. While the conventional slip-type expansion joint performs very satisfactorily when used in turbines employing steam pressures up to about 2500 p. s. i., their effectiveness diminishes when used in turbines dealing with pressures in the super-critical range. This results from the fact that when steam pressures of 3500 p. s. i. and above are used, the compressive forces imposed on the packing rings result in a binding effect between the adjacent rings to prevent them from sliding relative to each other. This binding action tends to prevent radial expansion of the inlet conduit relative to the casing.

Accordingly, an object of this invention is to provide an improved slip-type expansion joint having a plurality of packing rings interposed between the conduit and casing that are specially arranged to prevent leakage past the rings while permitting radial expansion of the conduit, and are specially supported to reduce the possibility of their binding when subjected to very high pressures.

A specific object is to provide a novel slip-type expansion joint in which the compressive forces acting thereon are divided among at least two support members so that the packing rings supported by each of the supports are not subject to excessive forces which would prevent them from sliding relative to each other to permit radial expansion of the conduit.

A still further object is to provide means for indicating when excessive leakage takes place past the packing rings.

Other objects and advantages will become apparent from the following description, taken in connection with the accompanying drawing, in which the figure represents a sectional view of a portion of a high temperature, double shell turbine casing with an inlet conduit connected thereto by a slip-type expansion joint incorporating the invention.

Generally stated, the invention is practiced by interposing a plurality of abutting packing rings divided into at least two groups between a high pressure high temperature conduit and casing; supporting each group by a retainer assembly fitted into the casing; and providing between the groups of rings a fluid at a pressure intermediate the inlet pressure and the pressure existing in the chamber formed between the inner and outer casings. This intermediate pressure divides the total pressure drop across the expansion joint between each group of rings to reduce the resultant compressive force acting on each group of packing rings to reduce the tendency for the packing rings to bind and thus prevent radial expansion of the conduit.

Referring now more particularly to the drawing, the invention is illustrated as applied to a high pressure high temperature steam inlet conduit indicated generally at 3, connected in a double shell turbine casing including an outer shell 1 and an inner shell 2.

The conduit 3 extends into cylindrical recess 1a located in the under portion of the outer casing 1 and aligned with steam inlet passage 1e. The lower part of inlet conduit 3 extends through an opening 2b in lower casing 2. The lower portion of inlet conduit 3 has formed integral therewith a nozzlebox assembly 4 which, as is apparent from the drawing, directs the high pressure high temperature steam to the bucket wheel 14 formed integral with turbine rotor 13. The inlet conduit 3 is secured to the inner casing 2 of the turbine by a coupling assembly of the type which forms the subject of an application by Raymond Sheppard et al., Serial No. 537,808, filed September 30, 1955, now Patent No. 2,800,299, and assigned to the same assignee as the present application. The steam passes through bucket wheel 14, diaphragm 15, second stage wheel 16 and subsequent stages (not shown) for driving the turbine. High pressure turbine shell 2 defines recess 2a which receives high pressure steam flowing between bucket wheel 14 and diaphragm 15 for a reason which will be apparent later.

The multiple ring packed slip joint to which the present invention particularly relates, incorporates a number of simple solid integral rings 5 disposed in an annular recess 1c defined by the outer casing 1 adjacent recess 1a. The upper groups of rings 5a, 5b, 5c, 5d are retained in place by a segmental abutment ring 6 disposed in an annular recess 1d having a somewhat larger diameter than the recess 1c. The separate segments of abutment ring 6 are prevented against moving radially by retaining ring 7. The ring 7 is closely fitted into recess 1c and defines openings 7a for reasons which will appear hereinafter. As will be noted, retaining ring 7 is axially supported by packing ring 5e but there are axial clearance spaces 7b, 7c defined between ring 7, and ring 5d and ring 6 respectively to prevent the axial loads acting on ring 6 from being transmitted to packing ring 5e. The lower group of rings 5e, 5f, 5g, 5h are retained in place by segmental abutment ring 8 and retaining ring 9. Abutment ring 8 prevents axial movement of rings 5e, 5f, 5g, 5h, while retaining ring 9 prevents radial movement of abutment ring 8. An axial clearance space 9a is provided between ring 5h and ring 9 to prevent the compressive forces acting on ring 5h from being transmitted to ring 9. The ring 9 may be held in position by any suitable means, such as a few light tack welds, or by peening the adjacent portion of the flange, as indicated at 15. More specifically, the exterior end surface of the retaining ring 9 may be provided with a plurality of circumferentially spaced notches into which a small portion of the adjacent flange may be peened. Other retaining devices, such as variously arranged locking screws might be used, but peening or tack welding are preferable because of the tendency of the fitted members to gall at such high temperatures. The retaining ring 9 defines an appreciable clearance space 11 with the casing 1 in order to reduce the tendency of the retaining ring to "gall" and stick to the casing 1. As will be seen from the drawing, the cooperating end portion 3a of the inlet conduit 3 is provided with a coating or inlay 3b of a special material such as that known to the trade as Haynes "Stellite," which material is carefully selected with reference to the material of the rings, so as to reduce the tendency to stick or "gall" under the influence of high temperatures and pressures.

As will be apparent from the drawing, the rings 5a, 5c, 5e and 5g have portions sealingly engaging the special insert 3b on the outer side of the inlet conduit 3; while the alternate rings 5b, 5d, 5f and 5h sealingly engage the surface of the annular recess 1c. The rings 5 are all relatively free to slide axially on the outer surface of the conduit 3 and the inner surface of the recess 3b respectively. When steam under pressure is supplied to the steam conduit 3 through opening 1e in outer casing 1, the hot steam acts directly on the end surface of the first ring 5a so that this ring is pushed axially into tight abutting relation with the second ring 5b. The large compressive force exerted by the high pressure fluid thus forces the packing rings 5a—5d into tight axially abutting relation, and against the abutment ring 6. Rings 5e—5h are held in abutting relation in a manner which will be apparent hereinafter. The high temperature of the fluid in conduit 3, casing opening 1e, and cylindrical recesses 1a, 1c result in heating up the conduit and sealing rings which are free to expand radially to prevent the build-up of thermal stresses.

However, as previously mentioned, the problem involved in turbines utilizing steam at 3500 p. s. i. or higher is that the extremely high axial compressive forces exerted by the motive fluid on the rings 5 result in high friction forces that tend to prevent them from sliding radially relative to each other. It can be appreciated that if radial movement of the rings is prevented, the normal radial expansion of the inlet conduit 3 cannot take place, and stresses will be built up which will tend to twist and distort the conduit 3.

To minimize the pressure differential across the retaining rings, it is a feature of this invention to provide steam at a pressure intermediate the high inlet pressure of 3500 p. s. i., and the pressure in the chamber 30 formed between the outer and inner casings 1, 2 respectively which may be on the order of 700 p. s. i., to the annular chamber 17 defined between sealing rings 5d, 5e and conduit 3. To this end, a passage 1b, which communicates with chamber 17, is located in outer casing 1 to receive steam under pressure from a conduit 20 consisting of sections 20a, 20b welded together by weld 20c. Conduit 20 is disposed in opening 2b in casing 2 which communicates with recess 2a in turbine casing 2. Conduit 20 is secured to outer casing 1 by welds indicated at 26 and 27. Thus, steam at a pressure on the order of 2000 p. s. i. is supplied from the space between bucket wheel 14 and diaphragm 15 to chamber 17 to partially balance out the compressive forces acting on rings 5a—5d. It is noted that the pressure conditions above stated are merely by way of example only, and it is only intended to set forth one of many pressure relationships which may be used. Fluid is prevented from leaking between the chamber 2a and chamber 30 formed between inner and outer casings by a multiple ring packed joint indicated generally at 21. This joint serves to seal against the leakage of high pressure steam, while permitting limited displacement of the conduit portion 20 in a plane transverse to the axis of the conduit. Such joints are well known in the art, one form being disclosed more particularly in the above-identified Doran Patent 2,112,738.

The method of assembling the packing rings 5 in the recess 1c and securing them by the retainer assemblies will be obvious from the above description of the structure. To facilitate ease of assembly of the sealing rings 5a—5d, the diameter of recess 1c below ring 6 may be made slightly larger than that of the portion above ring 6.

While the rings 5 provide a very effective seal against the leakage of motive fluid between the inlet conduit 3 and casing 1, it is possible that differential expansion between the conduit 3 and rings 5 may result in a permanent "set" in the ring; or excessive ring wear may result in excessive leakage taking place between chambers 17 and 30. To indicate the leakage between chambers 17 and 30, a conventional flow meter 25 is connected across orifice 28 located in conduit 20. Thus, if excessive leakage takes place past the expansion joint, the flow meter 25 registers flow in conduit 20 and corrective action can be taken.

The fact that some leakage may occur past rings 5a—5d into chamber 17 permits the novel expansion joint to provide a useful function when fluid under pressure from an outside source is not supplied to chamber 17. The passage 1b may be closed off and the uncontrolled leakage into chamber 17 past the rings 5a—5d will partially balance the compressive forces acting on rings 5a—5d to facilitate radial expansion of conduit 3 by permitting easier sliding action of rings 5. It should be noted that since the leakage past rings 5a—5d is very small, the support 6 will carry the largest portion of the compressive force and thus the passages 1b, 20 will normally be open at pressures above 3500 p. s. i. but the conduit 20 may be removed and opening 2b and passages 1b closed off by plugs (not shown) at pressures somewhat below 3500 p. s. i.

It will be apparent from the above description of the structure, that with this arrangement the inlet conduit 3 may shift transverselty relative to the outer casing 1 through sliding between the abutting radial faces of the sealing rings, as permitted by the radial clearances between conduit 3 and the sealing rings 5b, 5d, 5f and 5h and the similar clearances between the recess 1c and the alternate rings 5a, 5c, 5e, and 5g. At the same time, free axial sliding movement is permitted between the end portion 3a of the inlet conduit and the outer shell 1. Thus, this expansion joint permits free relative movement between the inlet conduit and the outer shell in all three dimensions. At the same time, the improved packing ring structure insures that the expansion of the inlet conduit 3 will not be prevented due to binding of the rings caused by excessive axial compressive forces.

By way of example, it may be noted that the inner and outer casing and the sealing rings are made of a ferritic material but that the rings have properties so that they may retain very high yield strength at elevated temperatures to take whatever small stretching effect is imposed on them by the expansion of the inlet conduit 3, without assuming any permanent set. It is desirable to surface-harden the sealing rings to prevent sticking and galling.

While only one modification of the invention has been described specifically, it will be apparent to those skilled in the art that many changes may be made. For instance, there may be more than one leak-off arrangement and more than two abutment rings could be used. The total number of rings employed will depend on the room available and the magnitude of the fluid pressure.

Many other changes will occur to those skilled in the art, and it is desired to cover by the appended claims all such modifications as fall within the true spirit and scope of the invention.

What I claim as new and desire to secure by Letters Patent in the United States is:

1. In an expansion joint for connecting a high pressure conduit to a casing; the combination of a casing having a wall defining an opening for receiving the conduit end portion and defining therewith a cylindrical recess, a sealing assembly disposed in said recess for preventing the leakage of the high pressure fluid through said recess to a lower pressure area adjacent said casing wall including a first group of sealing rings exposed to the fluid in said conduit, a second group of sealing rings axially spaced from said first group to define an annular chamber therebetween, each group of sealing rings including at least one ring having an inner circumferential surface sealingly engaging the outer surface of the conduit and an outer circumferential surface defining a first radial clearance space with the wall of the recess, and a second sealing ring disposed in the recess adjacent the first ring and having an internal circumferential surface forming a radial clearance space with the outer surface of the conduit and an outer circumferential surface in sealing engagement with the wall of the recess, a source containing fluid at a pressure intermediate the pressure in said conduit and lower pressure area, conduit means interconnecting said source to said chamber, first retaining means cooperating with the first group of sealing rings and casing for limiting axial movement thereof under the influence of the differential pressure between the fluid pressure in the high pressure conduit and the fluid pressure in said chamber, second retaining means cooperating with the second group of sealing rings and casing for limiting axial movement thereof under the influence of the differential pressure between the existing in said annular chamber and said lower pressure area, whereby the compressive forces resulting from the pressure of the fluid in said high pressure conduit is divided among at least two retaining means to limit the compressive forces on the groups of sealing rings.

2. In an expansion joint for connecting a thin wall conduit to a casing member, the combination of an annular casing portion surrounding the conduit end and spaced radially therefrom to define a cylindrical recess, a sealing assembly disposed in said recess for preventing the leakage of high pressure fluid in said conduit through said recess to a lower pressure area adjacent said casing, the sealing assembly including a first group of sealing rings, a second group of sealing rings axially spaced from said first group to define an annular chamber therebetween, each group of sealing rings including at least one ring having an inner circumferential surface sealingly engaging the outer surface of the conduit and an outer circumferential surface defining a first radial clearance space with the wall of the recess, and a second sealing ring disposed in the recess adjacent the first ring and having an internal circumferential surface forming a radial clearance space with the outer surface of the conduit and an outer circumferential surface in sealing engagement with the wall of the recess, first retaining means cooperating with the first group of sealing rings and casing for preventing axial movement of said first group of sealing rings, second retaining means cooperating with the second group of sealing rings and casing for preventing axial movement of said second group of sealing rings, means including a second conduit supplying fluid to said annular chamber at a pressure intermediate the pressure in said second conduit and that in said lower pressure area, and indicating means responsive to the flow of fluid in said second conduit whereby the leakage of fluid past said second group of sealing rings may be detected.

3. In an expansion joint for connecting a steam inlet conduit to a casing; the combination of a casing having a wall defining an opening for receiving the conduit end portion and defining therewith a cylindrical recess, a sealing assembly for preventing the leakage of motive fluid from said conduit through said recess, said sealing assembly including a first group of sealing rings exposed to the fluid in said conduit, a second group of sealing rings axially spaced from said first group, each group of sealing rings including at least one ring having an inner circumferential surface sealingly engaging the outer surface of the conduit and an outer circumferential surface defining a first radial clearance space with the wall of the recess, and a second sealing ring disposed in the recess adjacent the first ring and having an internal circumferential surface forming a radial clearance space with the outer surface of the conduit and an outer circumferential surface in sealing engagement with the wall of the recess, first retaining means cooperating with the first group of sealing rings and casing for preventing axial movement of the first group of sealing rings, second retaining means cooperating with the second group of sealing rings and casing for preventing axial movement of the second group of sealing rings, whereby the compressive forces acting on the expansion joint are partially supported by each retaining means to reduce the forces acting on each group of sealing rings to facilitate relative movement between the sealing rings to permit radial expansion of the inlet conduit.

4. In a turbine assembly comprising a first casing, a second casing disposed within said first casing and defining an intermediate chamber therebetween, the first casing having a wall defining an opening for receiving a high pressure inlet conduit and defining therewith a cylindrical recess, a sealing assembly for preventing the leakage of fluid through said cylindrical recess from said conduit to said intermediate chamber, the sealing assembly comprising a first group of sealing rings disposed in said recess and exposed to the fluid in said conduit, a second group of sealing rings disposed in said recess and axially spaced from said first group to define an annular chamber therebetween, each group of sealing rings including at least one ring having an inner circumferential surface sealingly engaging the outer surface of the conduit and an outer circumferential surface defining a first radial clearance space with the wall of the recess, and a second sealing ring disposed in the recess adjacent the first ring and having an internal circumferential surface forming a radial clearance space with the outer surface of the conduit and an outer circumferential surface in sealing engagement with the wall of the recess, first retaining means cooperating with the first group of sealing rings and casing for limiting axial movement of the first group of sealing rings, second retaining means cooperating with the second group of sealing rings and casing for limiting axial movement of the second group of sealing rings, a rotor in said inner casing and containing at least one bucket wheel, the wall of the inner casing defining a second opening downstream of said bucket wheel, the inner portion of said inlet conduit located in said inner housing and defining a nozzle opening for directing motive fluid to said bucket wheel, second conduit means interconnecting said second opening and said annular chamber for supplying fluid under a pressure intermediate the pressure in said inlet conduit and the pressure in said intermediate chamber, whereby the first group of sealing rings is subject to the differential pressure existing between the inlet conduit and said inner casing downstream of said first stage bucket wheel, and the second group of sealing rings is subject to the differential pressure existing between the pressure in the annular chamber and said intermediate chamber, and flow responsive means in said second conduit means for indicating the flow of fluid therein to readily detect excessive leakage past the sealing rings.

References Cited in the file of this patent

UNITED STATES PATENTS

| | | |
|---|---|---|
| 2,112,738 | Doran | Mar. 29, 1938 |
| 2,319,543 | Hall | May 18, 1943 |
| 2,367,134 | Mierley | Jan. 9, 1945 |
| 2,384,281 | Carter | Sept. 4, 1945 |
| 2,614,797 | Kidney | Oct. 21, 1952 |
| 2,649,315 | Ipsen | Aug. 18, 1953 |
| 2,775,470 | Bixler et al. | Dec. 25, 1956 |